United States Patent
Talbot

(10) Patent No.: US 10,122,968 B1
(45) Date of Patent: Nov. 6, 2018

(54) METHOD AND SYSTEM FOR USING A VIDEO RELAY SERVICE WITH DEAF, HEARING-IMPAIRED OR SPEECH-IMPAIRED CALLED PARTIES

(71) Applicant: Chris Talbot, Moorpark, CA (US)

(72) Inventor: Chris Talbot, Moorpark, CA (US)

(*) Notice: Subject to any disclaimer, the term of this patent is extended or adjusted under 35 U.S.C. 154(b) by 0 days.

(21) Appl. No.: 15/691,464

(22) Filed: Aug. 30, 2017

(51) Int. Cl.
| | | |
|---|---|---|
| H04N 7/14 | (2006.01) | |
| H04M 3/42 | (2006.01) | |
| G09B 21/00 | (2006.01) | |
| H04M 3/22 | (2006.01) | |
| H04M 3/38 | (2006.01) | |

(52) U.S. Cl.
CPC .......... H04N 7/147 (2013.01); G09B 21/009 (2013.01); H04M 3/2281 (2013.01); H04M 3/38 (2013.01); H04M 3/42102 (2013.01); H04M 3/42391 (2013.01)

(58) Field of Classification Search
CPC . G06Q 10/10; G09B 21/009; H04M 2201/50; H04M 2242/12; H04M 3/2281; H04M 3/38; H04M 3/42102; H04M 3/42229; H04M 3/42391; H04N 7/147
USPC ......... 348/14.01, 14.02, 14.03, 14.04, 14.05, 348/14.06, 14.07, 14.08, 14.09, 14.1, 348/14.11, 14.12, 14.13, 14.14, 15.15, 348/14.16; 382/275; 379/265.03; 455/414.1, 566; 704/270
See application file for complete search history.

(56) References Cited

U.S. PATENT DOCUMENTS

| | | | | |
|---|---|---|---|---|
| 5,978,014 A | * | 11/1999 | Martin ................ | H04L 12/1818 348/14.08 |
| 7,142,642 B2 | * | 11/2006 | McClelland ...... | H04M 3/42391 379/52 |
| 7,206,386 B2 | * | 4/2007 | Clapp ................. | H04L 12/2854 379/52 |
| 7,349,955 B1 | | 3/2008 | Korb et al. | |
| 7,573,985 B2 | * | 8/2009 | McClelland ...... | H04M 3/42391 379/52 |
| 7,746,984 B2 | * | 6/2010 | Nola ................. | H04M 3/42391 379/52 |
| 7,899,167 B1 | * | 3/2011 | Rae ........................ | H04M 3/38 370/260 |
| 8,010,706 B1 | | 8/2011 | Rein et al. | |

(Continued)

*Primary Examiner* — Khai N Nguyen
(74) *Attorney, Agent, or Firm* — Scheinberg & Associates, P.C.; John B. Kelly

(57) ABSTRACT

A method and system are disclosed for enabling indirect person-to-person calls between deaf, hard of hearing, or speech impaired (D-HOH-SI) inmates in a correctional institution and D-HOH-SI called parties outside the correctional institution. A man-in-the-middle approach enables a complete separation of the inmate and called party, preventing any possible non-ASL communications between them, thereby ensuring the safety and security of inmates, called parties, and the public in general. Standard restrictions on allowed called parties are implemented, along with protection of confidential calls from being recorded. A first VRS system enables video communication between the inmate and the man-in-the-middle who is a sign language interpreter, while a second video communications system enables video communication between the man-in-the-middle and the called party. No direct video contact between the inmate and called party is allowed or required.

21 Claims, 11 Drawing Sheets

(56) References Cited

U.S. PATENT DOCUMENTS

| | | | |
|---|---|---|---|
| 8,204,179 B2* | 6/2012 | Goldman | H04M 3/42391 379/52 |
| 8,345,827 B2* | 1/2013 | Liebermann | G09B 21/001 379/48 |
| 8,374,325 B2* | 2/2013 | Robotka | H04M 3/42 348/14.01 |
| 8,528,068 B1 | 9/2013 | Weglein et al. | |
| 8,817,966 B2* | 8/2014 | Wrench | G06Q 10/101 348/14.08 |
| 9,344,674 B2* | 5/2016 | Talbot | H04N 7/147 |
| 9,628,620 B1 | 4/2017 | Rae et al. | |
| 2003/0069997 A1* | 4/2003 | Bravin | G06F 17/2765 709/250 |
| 2005/0086699 A1* | 4/2005 | Hahn | H04M 3/42391 725/106 |
| 2005/0129185 A1* | 6/2005 | McClelland | H04M 3/42391 379/52 |
| 2005/0238143 A1* | 10/2005 | Clapp | H04L 12/2854 379/52 |
| 2006/0026001 A1* | 2/2006 | Bravin | G09B 21/009 704/270.1 |
| 2006/0074624 A1* | 4/2006 | Sahashi | H04M 3/567 704/8 |
| 2006/0285652 A1* | 12/2006 | McClelland | H04M 3/42391 379/52 |
| 2009/0028300 A1* | 1/2009 | McLaughlin | H04M 3/42391 379/52 |
| 2009/0262906 A1* | 10/2009 | Goldman | H04M 3/42391 379/52 |
| 2010/0066803 A1* | 3/2010 | Robotka | H04M 3/42 348/14.02 |
| 2012/0176466 A1* | 7/2012 | Wrench | G06Q 10/101 348/14.07 |
| 2015/0022616 A1* | 1/2015 | Talbot | H04N 7/147 348/14.01 |
| 2017/0034479 A1* | 2/2017 | Thelin | H04M 3/42391 |
| 2017/0187876 A1* | 6/2017 | Hayes | H04M 3/56 |
| 2018/0013886 A1 | 1/2018 | Rae et al. | |

* cited by examiner

| Scenario | Inmate Status | Called Party Status | Type of call | non-Confidential | Confidential |
|---|---|---|---|---|---|
| A | not D-HOH-SI | non-D-HOH-SI | P-to-P audio call | audio recorded | audio not recorded |
| B | not D-HOH-SI | D-HOH-SI | P-to-P audio call (ASL interpreter may be provided by called party) | audio recorded | audio not recorded |
| C | D-HOH-SI | non-D-HOH-SI | VRS call: inmate to ASL interpreter ⇔ Audio call: ASL interpreter to called party | video recorded / not recorded | video not recorded / not recorded |
| D | D-HOH-SI | D-HOH-SI | VRS call: inmate to ASL interpreter | video recorded | video not recorded |
| E | D-HOH-SI | D-HOH-SI | VRS call: inmate to ASL interpreter ⇔ Video call: ASL interpreter to called party | video recorded / not recorded | video not recorded / not recorded |

FIG. 1

METHOD AND SYSTEM FOR USING A VIDEO RELAY SERVICE WITH DEAF, HEARING-IMPAIRED OR SPEECH-IMPAIRED CALLED PARTIES

TECHNICAL FIELD OF THE INVENTION

The present invention relates to telecommunications services for callers who are deaf, hard-of-hearing, or speech impaired (D-HOH-SI), and in particular to indirect video communication between two D-HOH-SI parties.

BACKGROUND OF THE INVENTION

Traditional telephony presents a problem for persons who are who are D-HOH-SI. Communication by audio telephones requires each party to the call to be able to hear and/or speak to the other party in order to communicate. For hearing or speech impaired persons, audio communication is difficult or impossible, precluding the use of audio telephony.

The availability of affordable, high-speed packet-switched communications has led to the growth in the use of Video Relay Service (VRS) communication by D-HOH-SI persons. Using VRS equipment, D-HOH-SI persons can place video calls to communicate between themselves and with hearing individuals (non-D-HOH-SI) using sign language (SL). VRS equipment enables D-HOH-SI persons to talk to hearing individuals via a sign language interpreter (SLI), who uses a conventional telephone at the same time to communicate with the party or parties with whom the D-HOH-SI person wants to communicate.

In a corrections environment (e.g., prison, juvenile detention center, etc.), communications between inmates and the outside world present a unique set of issues due to various safety and security concerns for both called parties and even inmates. Considering that some inmates will be non-D-HOH-SI and others will be classified as D-HOH-SI, and also that some called parties will be non-S-HOH-SI while others may be D-HOH-SI, multiple scenarios of all-audio, video plus audio, or all-video calling methods may be necessary to address the needs of both inmates and called parties. FIG. 1 characterizes the requirements for each of these types of call, some of which (e.g., any call in which either the inmate and/or the called party is non-D-HOH-SI) have already been addressed by correctional institutions. The scenario in which both the inmate and the called party are D-HOH-SI, however, is a recently-recognized need, which through legal action on the part of inmates and advocates working on behalf of the D-HOH-SI community (both inmates and the general public) will soon be required on the part of correctional institutions.

All inmate-to-called party communications are typically subject to restrictions on who may be called by a particular inmate (each inmate may have a unique list of authorized numbers) and also restrictions on which called parties are confidential (attorneys, clergy)—non-confidential calls may routinely be recorded for security and safety considerations. With the advent of person-to-person (P-to-P) calling in cases where both the inmate and called party are D-HOH-SI, it will be necessary to maintain the same restrictions for these all-video calls. However, since these calls are all-video, unlike the case for earlier calling where one or both parties (inmate and called party) were non-D-HOH-SI, a possible complication may arise in which the inmate may "communicate" via non-American Sign Language (non-ASL) methods, essentially circumventing the security and safety goals intended to be addressed by audio or video recording of calls. These non-ASL methods may comprise wearing a certain color or patterned shirt, wearing a certain pin on the shirt, using non-ASL gestures, non-speech sounds, etc. These non-ASL methods can be used by the inmate to further criminal activities outside of the corrections facility by signaling to a non-incarcerated person outside of the corrections facility to engage in the furtherance of an illegal activity, for example, witness intimidation. Although video recording of the call may still capture these non-ASL methods, their meaning to correctional and law enforcement officers may be obscure or undecipherable, both in real-time during calls and even in subsequent reviews of video call recordings.

SUMMARY OF THE INVENTION

Embodiments of the present invention are directed to a method and system for enabling D-HOH-SI inmates to communicate with D-HOH-SI called parties while preventing all non-ASL communication, while still enabling control on the part of the correctional institution of what numbers each inmate is authorized and able to call. In addition, the privacy of inmate calls to confidential called parties (e.g., attorneys, clergy) is preserved by preventing unauthorized video recording of these calls. All other calls may be routinely video recorded to maintain safety and security for the correctional facility, other inmates, and the public in general, including called parties.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which:

FIG. 1 is a table characterizing five inmate-to-called party scenarios.

DETAILED DESCRIPTION OF PREFERRED EMBODIMENTS

Figure 2:
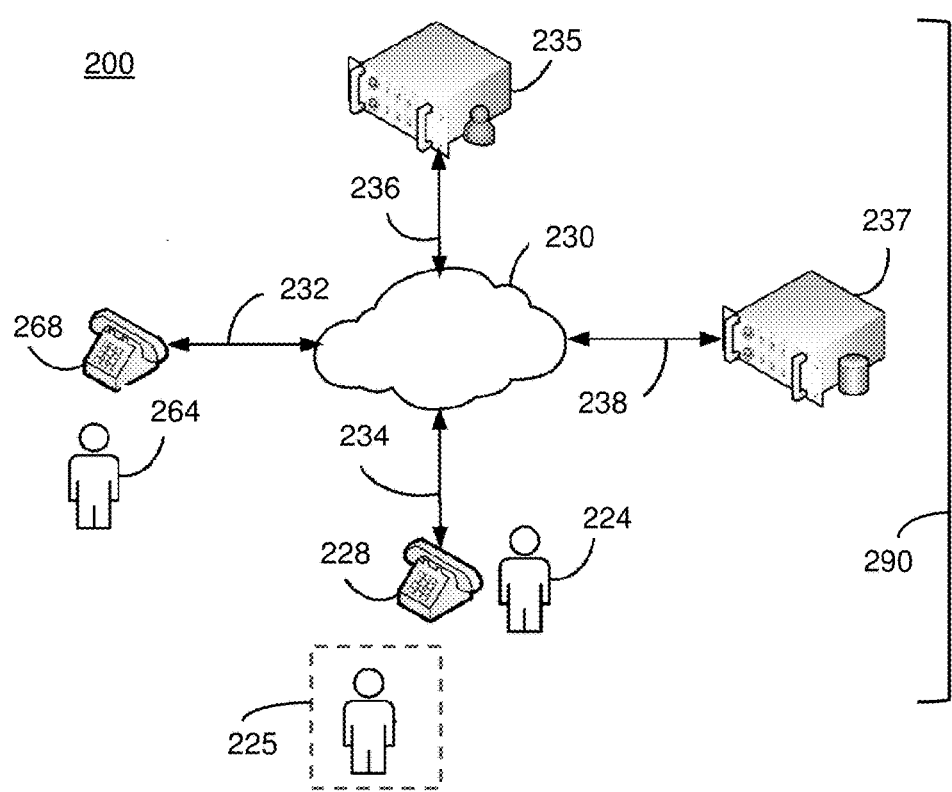
FIG. 2 shows scenarios A and B: calls from a non-D-HOH-SI inmate.

Communication between inmates in correctional institutions and the outside world can be an important contributor to the rehabilitation of inmates, ideally reducing recidivism rates and encouraging inmates leaving prison to lead productive, law-abiding lives. Maintaining ties to family and friends (at least law-abiding friends) can be an important component of this communication. In addition, inmates often need to communicate with their attorneys and clergy in confidential legally-protected calls. However, it is also necessary and important to prevent inmates from maintaining their previous illegal activities by communicating from prison with non-incarcerated criminal elements.

Thus, there is always a need for control over inmate-to-called party communications to ensure that the benefits of contact with the outside world may be maintained while avoiding a furtherance of criminal activities. To accomplish this balancing act, prisons routinely control which outside parties may be contacted by inmates by maintaining a list of authorized called party numbers for each inmate. Some unauthorized numbers may apply to all inmates, such as phone numbers known to correspond to criminal gangs and organizations. Other unauthorized numbers may be specific to a particular inmate, corresponding to ex-wives, ex-girlfriends/boyfriends, witnesses and jurors at the inmate's trial, etc.—where these individuals have explicitly or automatically (e.g., for witnesses or jurors) been placed in a "no call permitted" category to preserve privacy or ensure safety. The following sections describe various implementations for controlling which numbers an inmate may call, and also for recording calls made by inmates to those individuals for whom inmate-attorney or inmate-clergy confidentiality does not apply. Inmates who have been evaluated by hearing tests to be D-HOH-SI have special needs with respect to outside communications since clearly standard audio calls are inapplicable for these inmates.

Scenarios for Inmate-to-Called Party Calls

FIG. 1 is a table 100 characterizing five possible inmate-to-called party scenarios A-E. FIGS. 2-9 discuss these scenarios individually while two flowcharts in FIGS. 10 and 11 characterize the decision process for determining which call scenario is applicable for each inmate-to-called party call. Embodiments enable the use of scenario E (FIGS. 6-9) to prevent the need for an undesirable implementation of scenario D (FIGS. 4 and 5), instead.

Scenario A is a common all-audio person-to-person (P-to-P) call between a non-D-HOH-SI inmate and a non-D-HOH-SI called party (assumed to be outside the correctional facility in which the inmate resides). Safety and security measures may be applied to these calls, wherein the inmate may have only a limited number of pre-defined allowed outside numbers which may be called. In addition, audio recording/non-recording requirements may be applied depending on whether the call is to a confidential called party (e.g., attorney, clergy, etc.) in which case the call is not permitted to be recorded, or the call is to a non-confidential called party (e.g., family, friends, etc.) in which case the call may be recorded for safety and security purposes.

Scenario B is an all-audio P-to-P call in which the inmate is non-D-HOH-SI, however the called party is D-HOH-SI. An ASL interpreter may then be present at the called party's location to listen to the inmate on an audio phone and interpret in ASL for the called party. Alternatively, the D-HOH-SI called party may employ video remote interpreting (VRI) to assist in communicating with the non-D-HOH-SI inmate. Again, the safety and security measures applying to allowed outside called party numbers will typically apply as for scenario A. The audio recording/non-recording considerations on the part of the correctional institution may be the same as for scenario A.

Scenarios C-E are calls for which the inmate is classified as D-HOH-SI, typically based on hearing tests conducted at the inmate's request within the correctional institution. Once an inmate has been classified as D-HOH-SI, only call scenarios C-E may be applicable. Inmates placing, or attempting to place, calls under scenarios A or B after being characterized as D-HOH-SI could logically be suspected of erroneously having obtained the D-HOH-SI evaluation, and might then be subject to disciplinary procedures.

Figure 3:
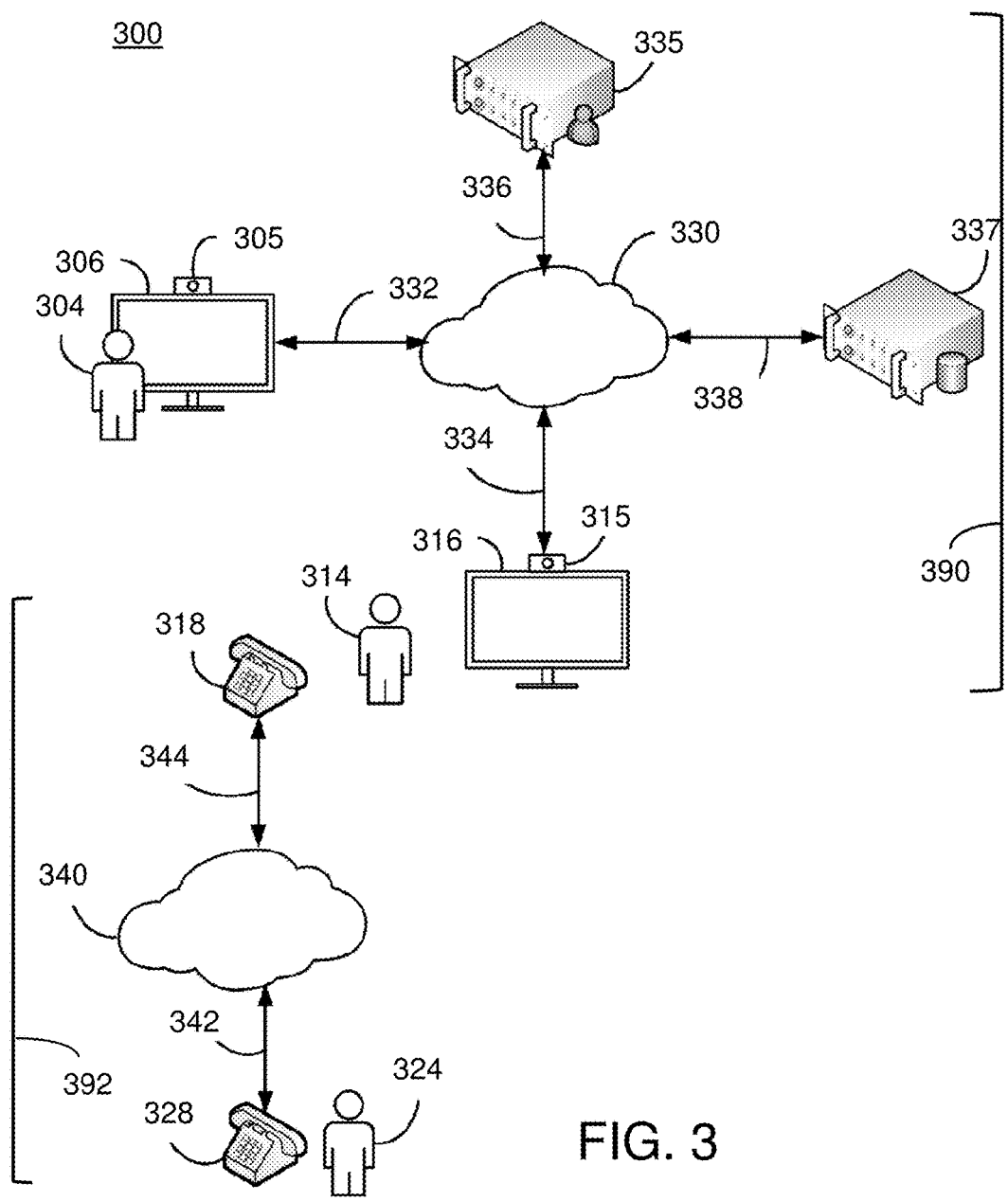
FIG. 3 shows scenario C: a D-HOH-SI inmate calling a non-D-HOH-SI called party.

Scenario C corresponds to a D-HOH-SI inmate, but wherein the called party is non-D-HOH-SI. This type of call comprises a two-step process, as illustrated in FIG. 3, where the D-HOH-SI inmate places a VRS call to an ASL interpreter who then speaks by way of a standard audio phone to the non-D-HOH-SI called party. As for calls under scenarios A and B, both safety and recording/non-recording considerations may typically apply. Note that unlike the all-audio calls for scenarios A and B, scenario C comprises two calls, a VRS call from the inmate to an ASL interpreter, and then an audio call from the ASL interpreter to the called party. Typically, the VRS call (if it is non-confidential) may be video-recorded, while the audio call may not require recording.

Scenario D is a recently-arising development for correctional institutions, corresponding to a D-HOH-SI inmate directly calling a D-HOH-SI called party. Communication between D-HOH-SI inmates and D-HOH-SI called parties is expected to be mandated by Federal Courts based on pending lawsuits demanding correctional institutions to facilitate communication between D-HOH-SI inmates and D-HOH-SI family, attorneys, clergymen, friends, etc. in the same way that non-D-HOH-SI inmates are already able to communicate in call scenarios A and B, and D-HOH-SI inmates are already able to communicate with non-D-HOH-SI called parties in scenario C. In Table 100, scenario D is viewed with concern by correctional institutions and other law enforcement officials due to the opportunities for undesirable communication as described above and in the discussion of FIG. 5.

Scenario E is according to embodiments, and corresponds to a D-HOH-SI inmate communicating with a D-HOH-SI called party using a controlled, monitored, and indirect method as illustrated in FIGS. 6-9. This scenario provides the same ASL communication capabilities between inmates and called parties as in scenario D, but prevents undesirable non-ASL communications capable of circumventing monitoring and detection during video calls and in video recordings of calls.

Scenarios A and B: Non-D-HOH-SI Inmate

FIG. 2 shows scenarios A and B 200: calls from a non-D-HOH-SI inmate 264, located in proximity to an audio phone 268 via an audio link 290. Audio phone 268 is shown with a link 232 to a network 230, corresponding to a voice-over-the-internet (VoIP) calling scheme. In other cases, a non-internet type of phone (e.g., land-line) connection may be employed. In both scenarios A and B, inmate 264 would be characterized as non-D-HOH-SI and thus would be able to communicate verbally. A called party 224 is also located in proximity to an audio phone 228, connected by a link 234 to network 230. In scenario A, called party 224 is non-D-HOH-SI and is therefore capable of communicating verbally through audio phone 228. In scenario B, called party 224 is D-HOH-SI and may require the ASL translation services of an interpreter 225.

In a variant of scenario B, the ASL interpreter 225 may be an intermediate "called party" (such as a video remote interpreter) who receives an audio call from inmate 264, and then communicates with the final "called party" 224 by means of a standard video call (e.g., Skype), thereby conveying the content of the audio call from inmate 264 to called party 224 using ASL.

Figure 10:
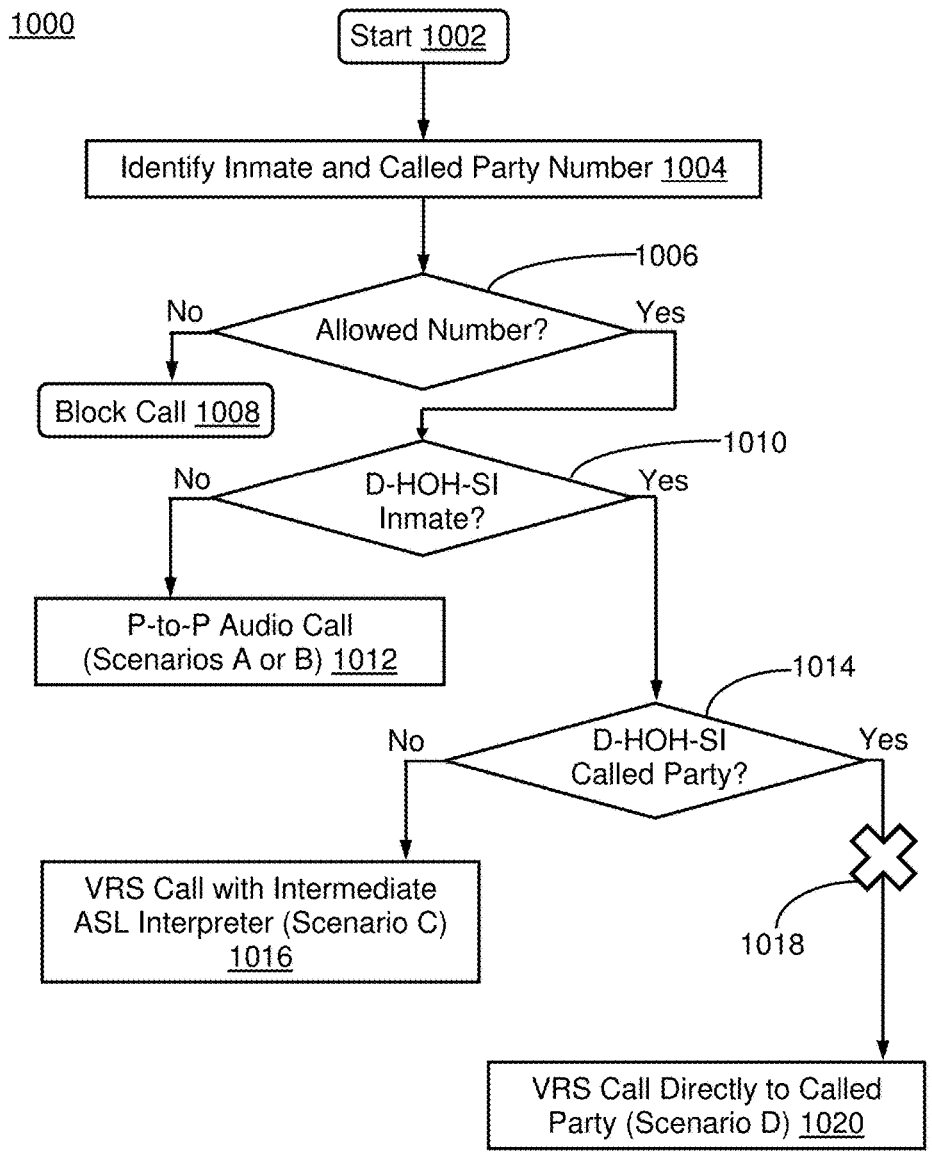
FIG. 10 shows a flowchart for inmate-to-called party scenarios A-D.
Figure 11:
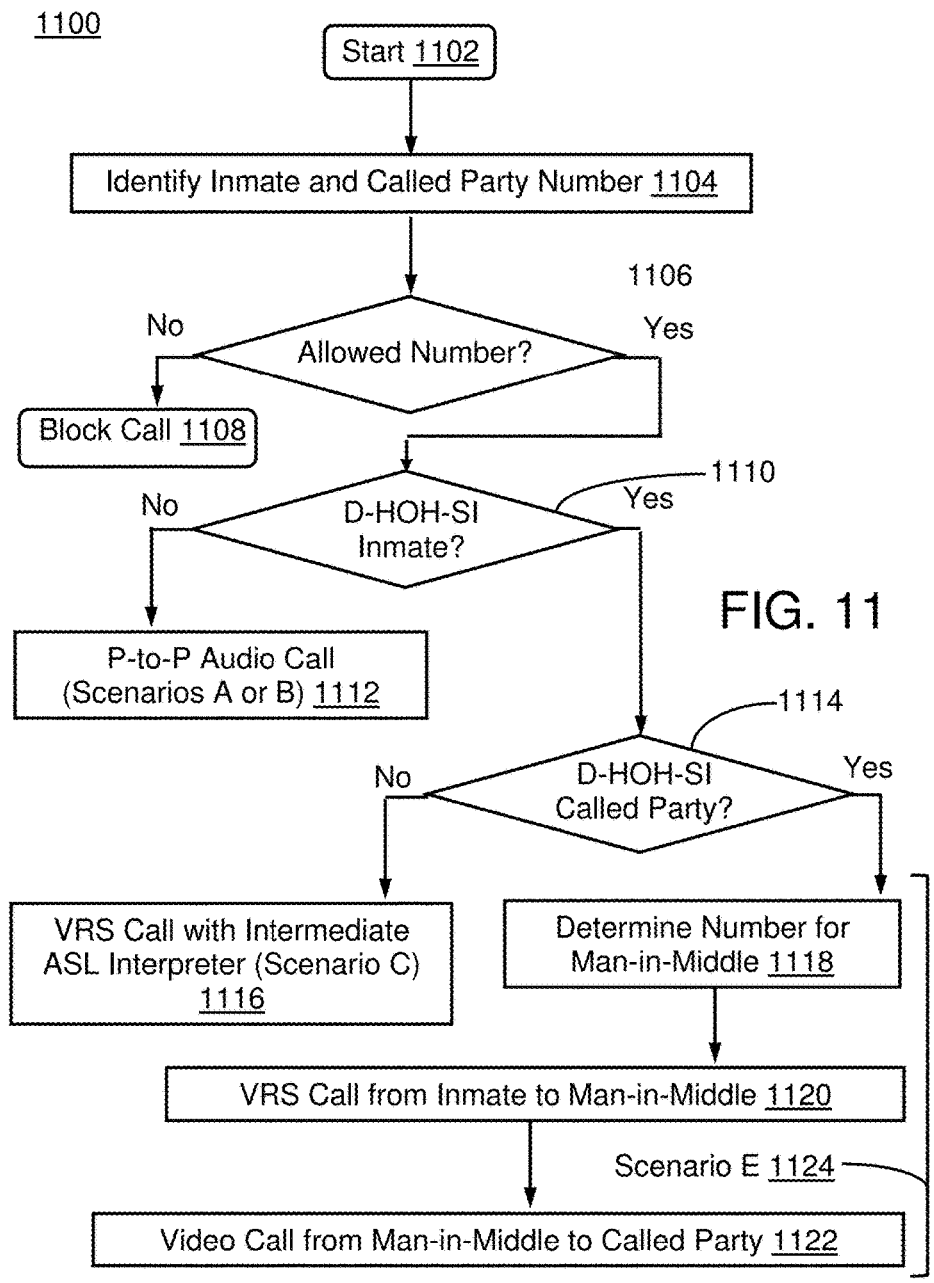
FIG. 11 shows a flowchart for inmate-to-called party scenarios A-C and E.

A rules gateway 235 may communicate with network 230 over a link 236. Rules gateway 235 stores call information for each inmate, including a list of allowed called-party phone numbers. As illustrated in FIGS. 10 and 11, if inmate 264 attempts to call any number not on this list of allowed numbers, the call will be blocked and the correctional institution authorities will be notified that inmate 264 has attempted a non-allowed call, potentially leading to disciplinary actions against inmate 264. Rules gateway 235 also stores information about which allowed call numbers correspond to confidential calls which are not permitted to be recorded—this information is used to control the operation of a recorder 237 during audio calls in scenarios A and B.

Recorder 237 is a device capable of recording audio calls (over a link 238 to network 230), and may be located in the corrections environment where inmate 264 is located, or offsite at another secure location. In some cases, multiple recorders 237 in one or more secure locations may be implemented to simultaneously record audio inmate-to-called party calls, thereby ensuring redundancy should any of the multiple recorders 237 fail during recording of a call. Rules gateway 235 and one or more recorders 237 may be implemented as separate and distinct systems that operate independent of location and communicate with each other by way of the Internet. Alternatively, rules gateway 235 and one or more recorders 237 may be combined to suit a particular application.

Scenario C: D-HOH-SI Inmate Calling a Non-D-HOH-SI Called Party

FIG. 3 shows scenario C 300: a D-HOH-SI inmate 304 calling a non-D-HOH-SI called party 324 via a video link 390 and an audio link 392. Inmate 304 is in proximity to, and interacts with, a VRS client 305 thereby being able to communicate by a video link 332 with a network 330. Inmate 304 may be a person who is D-HOH-SI, or any other person who communicates via SL. Inmate 304 interacts with VRS client 305 by viewing video on a display 306 and by being viewed with a video capture device (e.g., video camera) in VRS client 305. Display 306 is any device suitable for displaying to inmate 304 a video signal from a sign language interpreter (SLI) 314 (at a VRS client 315), with sufficient video quality and frame rate so that a person fluent in SL can comprehend SLI 314. VRS client 305 also includes hardware and/or software to convert, substantially in real-time, the captured video signal into a data stream suitable for transmission to network 330 over video link 332.

VRS client 315 has link 334 to network 330, and can be operated by a VRS service provider. A display 316 can be any device suitable for displaying to SLI 314 a video signal of inmate 304 with sufficient quality and frame rate so that SLI 314 can comprehend the SL from inmate 304. VRS client 315 can include a video capture device suitable for capturing a video signal of SLI 314 within the field-of-view of the video capture device at sufficient quality and frame rate to support SL communication with inmate 304. Called party 324 can be a person (non-D-HOH-SI) who can communicate verbally over an audio phone 328 through a link 342 to a network 340, which is connected by a link 344 to an audio phone 318, in proximity to SLI 314. In some cases, networks 330 and 340 may be the same network, in other cases networks 330 and 340 may be separate. The audio call between phones 318 and 328 may also employ land-lines or wireless cell phones.

A rules gateway 335 is connected to network 330 over a link 336. Rules gateway 335 may be located in the corrections environment where inmate 304 is located or rules gateway 335 may be included in service side equipment located at a facility operated by the VRS service provider. Rules gateway 335 can be used to perform at least two important functions: 1) determining whether the called party phone number is an authorized number on the inmate's call list, and 2) determining whether the VRS call should be (or is not allowed to be) video-recorded.

A recorder 337 is a device capable of recording video calls, including audio, video, and any watermarks applied to the call. A link 338 may connect recorder 337 to network 330. Recorder 337 may be located in the corrections environment where inmate 304 is located, or recorder 337 may be included in service side equipment located at a facility operated by the VRS service provider. Recorder 337 can be programmed to automatically record a VRS call based on call properties associated with the VRS call (stored in rules gateway 335).

Rules gateway 335, recorder 337, VRS client 305, and VRS client 315 may be implemented as separate and distinct systems that operate independent of location and communicate with each other by way of network 330, possibly employing various internet protocols. Alternatively, one or more of rules gateway 335, recorder 337, VRS client 305, and VRS client 315 can be combined to suit a particular application. The same redundancy considerations apply to the recording of video calls in scenario C as applied in FIG. 2 for audio call recording in scenarios A and B.

Inmate 304 initiates a VRS video call to SLI 314. SLI 314 then uses telephone 318 to place a call to called party 324 on behalf of inmate 304. SLI 314 and inmate 304 communicate using SL via VRS client 315 and VRS client 305, respectively. SLI 314 and called party 324 communicate verbally via telephone 318 and telephone 328, respectively. In this way, SLI 314 acts as an intermediary between inmate 304 and called party 324, interpreting the communication between inmate 304 and called party 324. Note that in scenario C, communication between inmate 304 and called party 324 is always indirect, with SLI 314 as a "man-in-the-middle". Certain types information, such as shirt color or pattern, clothing accessories, non-ASL hand gestures, etc. cannot be shared between inmate 304 and called party 324 because there is no direct video contact between inmate 304 and called party 324. This situation is in contrast to potential interactions in scenario D.

Scenario D: D-HOH-SI Inmate Directly Calling a D-HOH-SI Called Party

Figure 4:
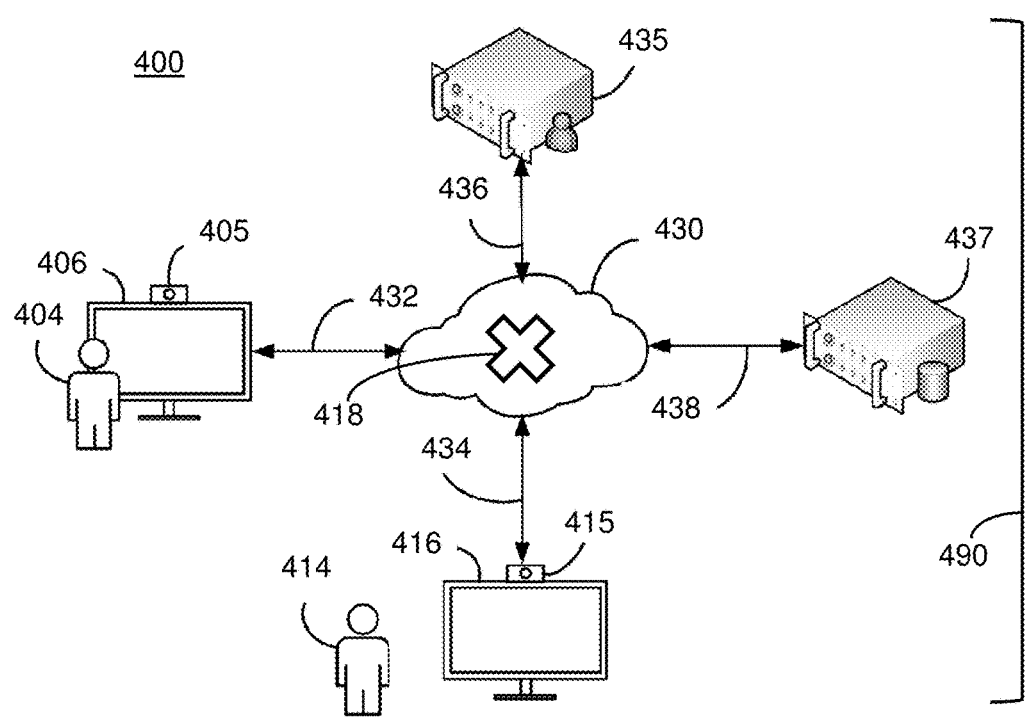
FIG. 4 shows scenario D: a D-HOH-SI inmate directly calling a D-HOH-SI called party.

FIG. 4 shows scenario D 400: a D-HOH-SI inmate 404 directly calling a D-HOH-SI called party 414 by means of a direct video link 490. At present, this scenario is becoming a possibility due to lawsuits filed on the behalf of D-HOH-SI inmates having the desire or need to communicate with (authorized) called parties (attorneys, clergy, family, friends, etc.). In particular, section 504 of the Rehabilitation Act of 1973, codified at 29 U.S.C. 794, as amended, guarantees persons with disabilities equal access to any entity that received federal financial assistance, either directly or indirectly, including federal, state and local corrections and jail facilities. In addition, Title II of the Americans with Disabilities Act (ADA), 42 U.S.C. 12141 et seq., now extends these same rights to inmates in all state and local correctional facilities. Legal analyses have emphasized that detention and correctional facilities must insure that their programs and activities are accessible to handicapped (in this case, D-HOH-SI) persons, both on the inmate side and on the called party side.

Figure 5:
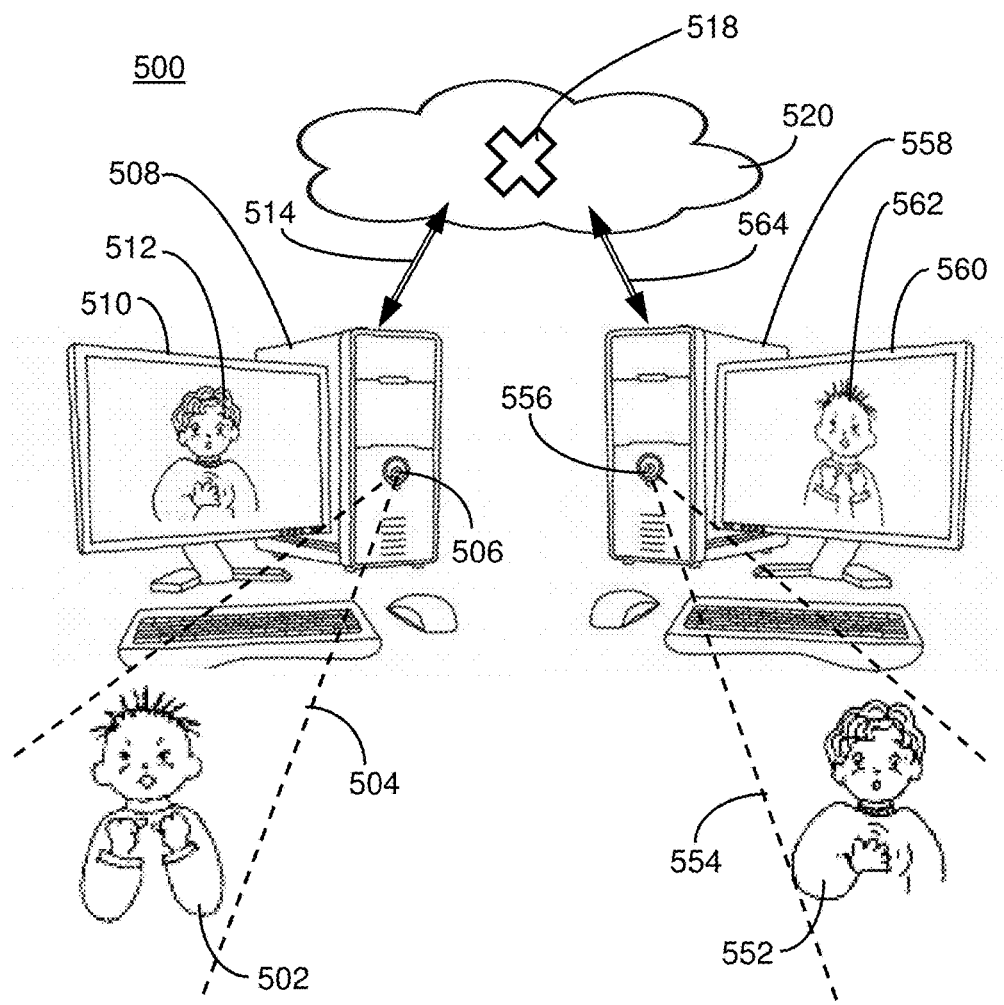
FIG. 5 shows an exemplary scenario D call.

Scenario D in FIG. 4 is one possible way to address these federally-mandated requirements—a direct video (VRS) link 490 between inmate 404 and called party 414. However, as illustrated in FIG. 5, this is considered by correctional and law enforcement authorities to be an undesirable and potentially dangerous (for inmates, called parties, and members of the general public) scenario—thus embodiments as described in scenario E (FIG. 6) are intended to address these valid safety and security concerns, while still meeting all current and anticipated legal requirements for inmate-to-called party communications.

Inmate 404 is in proximity to, and interacts with, a VRS client 405 thereby being able to communicate by a video link 432 with a network 430. Inmate 404 may be a person who is D-HOH-SI, or any other person who communicates via SL. Inmate 404 interacts with VRS client 405 by viewing video on a display 406 and by being viewed with a video capture device (e.g., video camera) in VRS client 405. Display 406 is any device suitable for displaying to inmate 404 a video signal from called party 414 (at a VRS client 415), with sufficient video quality and frame rate so that a person fluent in SL can comprehend the called party. VRS client 405 also includes hardware and/or software to convert, substantially in real-time, the captured video signal into a data stream suitable for transmission to network 430 over link 432.

VRS client 415 communicates with network 430 through a link 434, and can be operated by a VRS service provider. A display 416 can be any device suitable for displaying to called party 414 a video signal of inmate 404 with sufficient quality and frame rate so that called party 414 can comprehend the SL from inmate 404. VRS client 415 can include a video capture device suitable for capturing a video signal of called party 414 within the field-of-view of the video capture device at sufficient quality and frame rate to support SL communication with inmate 404.

A link 436 may connect a rules gateway 435 to network 430. Rules gateway 435 may be located in the corrections environment where inmate 404 is located or rules gateway 435 may be included in service side equipment located at a facility operated by the VRS service provider. Rules gateway 435 can be used to perform at least two important functions: 1) determining whether the called party phone number is an authorized number on the inmate's call list, and 2) determining whether the VRS call should be (or is not allowed to be) video recorded.

A recorder 437 is a device capable of recording video calls, including audio, video, and any watermarks applied to the call. A link 438 may connect recorder 437 to network 430. Recorder 437 may be located in the corrections environment where inmate 404 is located, or recorder 437 may be included in service side equipment located at a facility operated by the VRS service provider. Recorder 437 can be programmed to automatically record a VRS call based on call properties associated with the VRS call (stored in rules gateway 435).

Rules gateway 435, recorder 437, VRS client 405, and VRS client 415 may be implemented as separate and distinct systems that operate independent of location and communicate with each other by way of network 430, possibly employing various internet protocols. Alternatively, one or more of rules gateway 435, recorder 437, VRS client 405, and VRS client 415 can be combined to suit a particular application. The same redundancy considerations apply to the recording of video calls in scenario D as applied in FIG. 3 for video call recording in scenario C.

Inmate 404 initiates a VRS video call to called party 414. Called party 414 and inmate 404 communicate using SL via VRS client 405 and VRS client 415. Note that unlike the situation for scenario C (FIG. 3), where a man-in-the-middle was a natural result of the need for SLI 314, in scenario D there is no intermediary (man-in-the-middle) between inmate 404 and called party 414. As a result of this direct video connection, there is now the possibility for non-ASL communication (shirt color or pattern, clothing accessories, non-ASL hand gestures, non-speech sounds, etc.) to occur between inmate 404 and called party 414. Therefore, multiple opportunities for abuse on the part of the inmate 403, called party 414, or both, present themselves in scenario D, as discussed in FIG. 5. X-mark 418 in network 430 schematically indicates the undesirability of scenario D as a method for addressing the legal requirements of the Rehabilitation Act of 1973 and the Americans with Disabilities Act, as applied to the situation where both the inmate and called party are D-HOH-SI.

An Exemplary Scenario D Call

FIG. 5 shows an exemplary VRS call 500 between an inmate 502 and a called party 552 under scenario D in which there is a direct video link (i.e., no man-in-the-middle). Note that the standard security procedures for this call have still been met: 1) called party 552 is on the authorized call list for inmate 502, and 2) the VRS call may be video recorded unless called party 552 is on the confidential call number list (attorneys, clergy, etc.)

Inmate 502 may view called party 552 on a display 510, wherein a video capture device 506 (in a VRS client 508) captures (with a field of view 504) an image of inmate 502 of sufficient quality for a display 562 on a screen 560, visible to called party 552, to enable called party 552 to interpret sign language presented by inmate 502. Similarly, a video capture device 556 (in a VRS client 558) captures (with a field of view 554) an image of called party 552 of sufficient quality for the display 512 on screen 510, visible to inmate 502, to enable inmate 502 to interpret sign language presented by called party 552. VRS client 508 is connected to a network 520 by a link 514, while VRS client 558 is connected to network 520 by a link 564. X-mark 518 in network 520 schematically indicates the undesirability of scenario D, from the perspective of correctional institutions on behalf of inmates, called parties, and the public in general.

What are the security and safety concerns with implementing scenario D in a correctional environment? In FIG. 5, inmate 502 is displaying the ASL gesture for "anger", and simultaneously called party 552 is displaying the ASL gesture for "fear". Inmate 502 may be angry about some element of the relationship between inmate 502 and called party 552 (a spouse, significant other, family member, friend, or possibly the inmate's attorney or clergyperson). Inmate 502 may be angry with prison life, or some other factor. In any case, this type of interaction may be deemed undesirable, although the video recording of this call (assuming the call is non-confidential) would record this interaction, which since it is expressed through standard ASL gestures, would be interpretable by correctional authorities. However, other situations are possible where inmate 502 and called party 552 have one or more pre-defined non-ASL gestures, having meanings or signals which inmate 502 and called party 552 wish to communicate between them without detection by correctional authorities, either in real-time during the scenario D call, or during a subsequent review of the video-recorded call. Other ways of conveying non-ASL messages are also possible, such as shirt colors or patterns, clothing accessories (e.g., pins on the lapel), non-ASL gestures, or non-speech sounds. All of these may be grouped into a category of "secret signals", falling outside the scope of standard ASL communication and potentially either undetectable, or at least uninterpretable, by correctional authorities.

Multiple "abuses" of the legal right for inmate-to-called party calls using secret signals may occur:

1) Inmate 502 may threaten or upset called party 552,
2) Called party 552 may threaten or upset inmate 502,
3) Orders may be conveyed by inmate 502 to called party 552, such as to threaten or harm a witness or juror in some legal action involving inmate 502, or for the called party 552 to commit an illegal act,
4) Orders may be conveyed by called party 552 to inmate 502 to perform some action within the correctional institution which is unauthorized or illegal,
5) Other possibilities for abuse are also possible whenever communication between an inmate 502 and called party 552 is allowed to occur using a direct two-way video link according to scenario D. For these reasons, embodiments as described in FIGS. 6-9 for scenario E preserve the legal rights of inmates and members of the general public (both called parties and others) while avoiding these possibilities for abuse of the system by means of secret signals.

Figure 6:
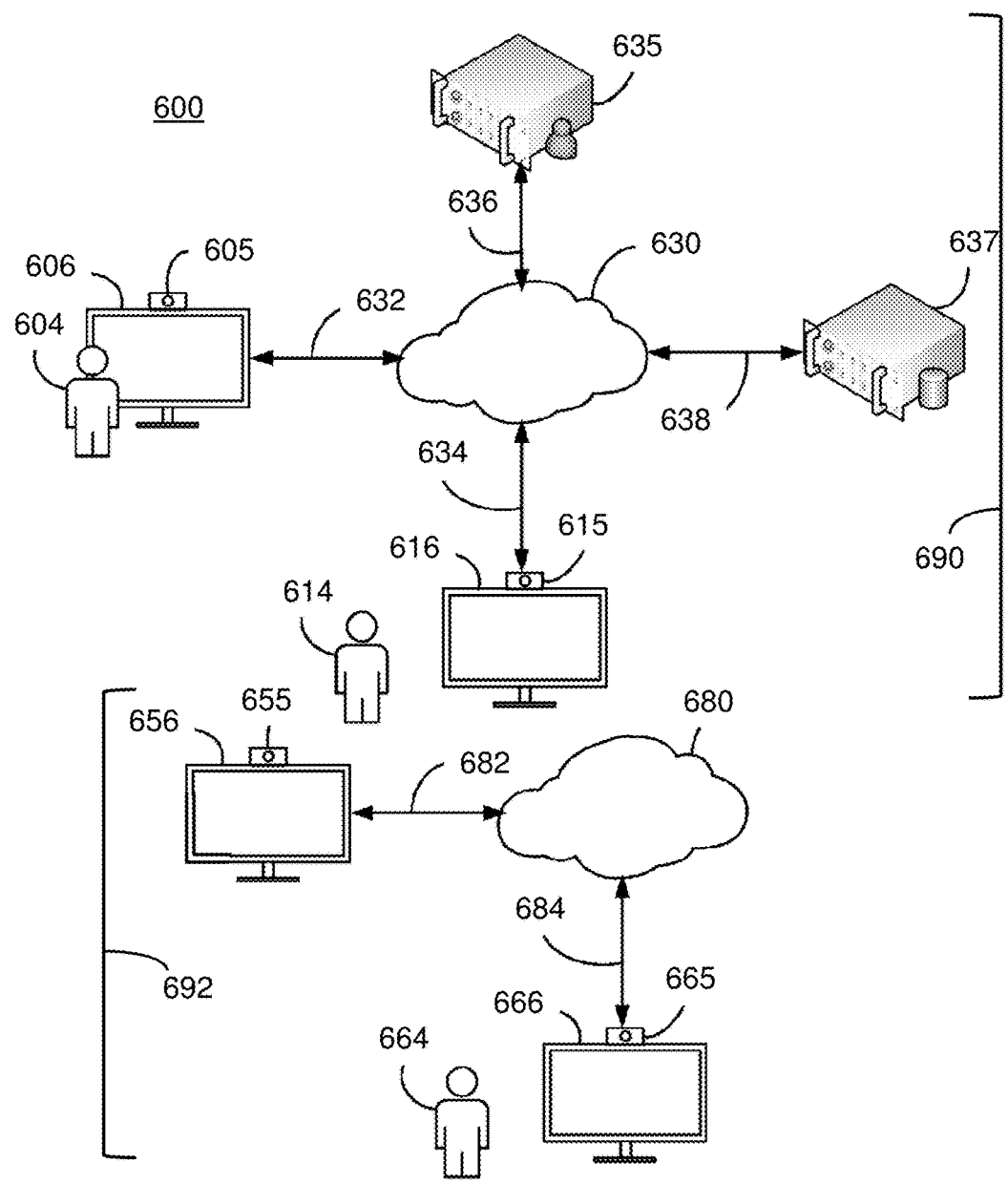
FIG. 6 shows scenario E: a D-HOH-SI inmate indirectly calling a D-HOH-SI called party according to a first embodiment.

Scenario E: D-HOH-SI Inmate Indirectly Calling a D-HOH-SI Called Party According to a First Embodiment FIG. 6 shows scenario E 600: a D-HOH-SI inmate 604 indirectly communicating with a D-HOH-SI called party 664 according to a first embodiment. The system shown in FIG. 6 comprises two parts:

1) a first video link 690 between D-HOH-SI inmate 604 and an SLI 614, and
2) a second video link 692 between SLI 614 and D-HOH-SI called party 664.

The first video link 690 is comparable to the VRS calling system in FIG. 3 for scenario C, between inmate 304 and SLI 314. A difference between scenario C and scenario E is that instead of an audio call between SLI 314 and non-D-HOH-SI called party 324, in scenario E a video call is necessary between SLI 614 and the D-HOH-SI called party 664 since called party 324 cannot conduct audio communications.

In scenario E, D-HOH-SI inmate 604 wants to communicate with D-HOH-SI called party 664, however because of the safety and security concerns discussed for scenario D, an intermediate "Man-in-the-Middle" (SLI 614) is used to prevent any of the secret signals discussed for scenario D in FIG. 5 from being communicated between inmate 604 and called party 664. Inmate 604 is in proximity to, and interacts with, a VRS client 605 thereby being able to communicate by a video link 632 with a network 630. Inmate 604 may be a person who is D-HOH-SI, or any other person who communicates via SL. Inmate 604 interacts with VRS client 605 by viewing video on a display 606 and by being viewed with a video capture device (e.g., video camera) in VRS client 605. Display 606 is any device suitable for displaying to inmate 604 a video signal from SLI 614 (at a VRS client 615), with sufficient video quality and frame rate so that an inmate 604 can comprehend the SL gestures communicated by SLI 614. VRS client 605 also includes hardware and/or software to convert, substantially in real-time, the captured video signal into a data stream suitable for transmission to network 630 over video link 632.

VRS client 615 can be operated by a VRS service provider. A display 616 can be any device suitable for displaying to SLI 614 a video signal of inmate 604 with sufficient quality and frame rate so that SLI 614 can comprehend the SL gestures communicated by inmate 604. VRS client 615 can include a video capture device suitable for capturing a video signal of SLI 614 within the field-of-view of the video capture device at sufficient quality and frame rate to support SL communication with inmate 604. VRS client 615 also includes hardware and/or software to convert, substantially in real-time, the captured video signal into a data stream suitable for transmission to network 630 over a video link 634.

A rules gateway 635 is connected to network 630 over a link 636. Rules gateway 635 may be located in the corrections environment where inmate 604 is located or rules gateway 635 may be included in service side equipment located at a facility operated by the VRS service provider. Rules gateway 635 has the same two functions as rules gateway 335 in FIG. 3 (scenario C) and rules gateway 435 in FIG. 4 (scenario D).

A recorder 637 is a device capable of recording video calls, including audio, video, and any watermarks applied to the call. Recorder 637 can be connected to network 630 over a link 638. Recorder 637 may be located in the corrections environment where inmate 604 is located, or recorder 637 may be included in service side equipment located at a facility operated by the VRS service provider. Recorder 637 can be programmed to automatically record a VRS call based on call properties associated with the VRS call (stored in rules gateway 635).

Rules gateway 635, recorder 637, VRS client 605, and VRS client 615 may be implemented as separate and distinct systems that operate independent of location and communicate with each other by way of network 630, possibly employing various internet protocols. Alternatively, one or more of rules gateway 635, recorder 637, VRS client 605, and VRS client 615 may be combined to suit a particular application. The same redundancy considerations apply to the recording of video calls in scenario E as applied in FIG. 3 (scenario C) and in FIG. 4 (scenario D).

SLI 614 is in proximity to, and interacts with, a video communications terminal 655, connected to a network 680 by a link 682. In some embodiments, network 680 may be the same as network 630. In some embodiments, network 680 may be a different network than network 630. SLI 614 interacts with video communications terminal 655 by viewing video on a display 656 and by being viewed with a video capture device (e.g., video camera) in video communications terminal 655. Display 656 is any device suitable for displaying to SLI 614 a video signal from called party 664 (at a video communications terminal 665), with sufficient video quality and frame rate so that a SLI 614 can comprehend the SL gestures communicated by called party 664. Video communications terminal 655 also includes hardware and/or software to convert, substantially in real-time, the captured video signal into a data stream suitable for transmission to network 680 over video link 682.

A display 666 can be any device suitable for displaying to called party 664 a video signal of SLI 614 with sufficient quality and frame rate so that called party 664 can comprehend the SL gestures communicated by SLI 614. Video communications terminal 665 can include a video capture device suitable for capturing a video signal of called party 664 within the field-of-view of the video capture device at sufficient quality and frame rate to support SL communication with SLI 614. Video communications terminal 665 also includes hardware and/or software to convert, substantially in real-time, the captured video signal into a data stream suitable for transmission to network 680 over a video link 684. In embodiments, video communications terminals 655 and 665 may be VRS systems. In embodiments, video communications terminals 655 and 665 may be commonly-available video communications terminals running applications such as Skype, etc.

Inmate 604 initiates a VRS call to SLI 614. SLI 614 and inmate 604 communicate using SL via VRS client 615 and VRS client 605, respectively. SLI 614 and called party 664 interact using SL via video communications terminals 655 and 665, respectively. Note that unlike the situation for scenario D (and like the situation in scenario C), in scenario E there is now a "man-in-the-middle" (SLI 614) between inmate 604 and called party 664. Thus, there is no possibility for non-ASL communication (shirt color or pattern, clothing accessories, non-ASL hand gestures, non-speech sounds, etc.) to occur between inmate 604 and called party 664. Embodiments according to scenario E thereby address the legal requirements of the Rehabilitation Act of 1973 and the Americans with Disabilities Act, as applied to both inmate 604 and called party 664, while simultaneously addressing the valid security and safety concerns presented by scenario D. To prevent inadvertent direct video communication between inmate 604 and called party 664, it is preferred that the video capture device in VRS client 615 is incapable of viewing display 656, and similarly, it is preferred that the video capture device in video communications terminal 655 is incapable of viewing display 616.

An Exemplary Scenario E Call According to a First Embodiment

Figure 7:
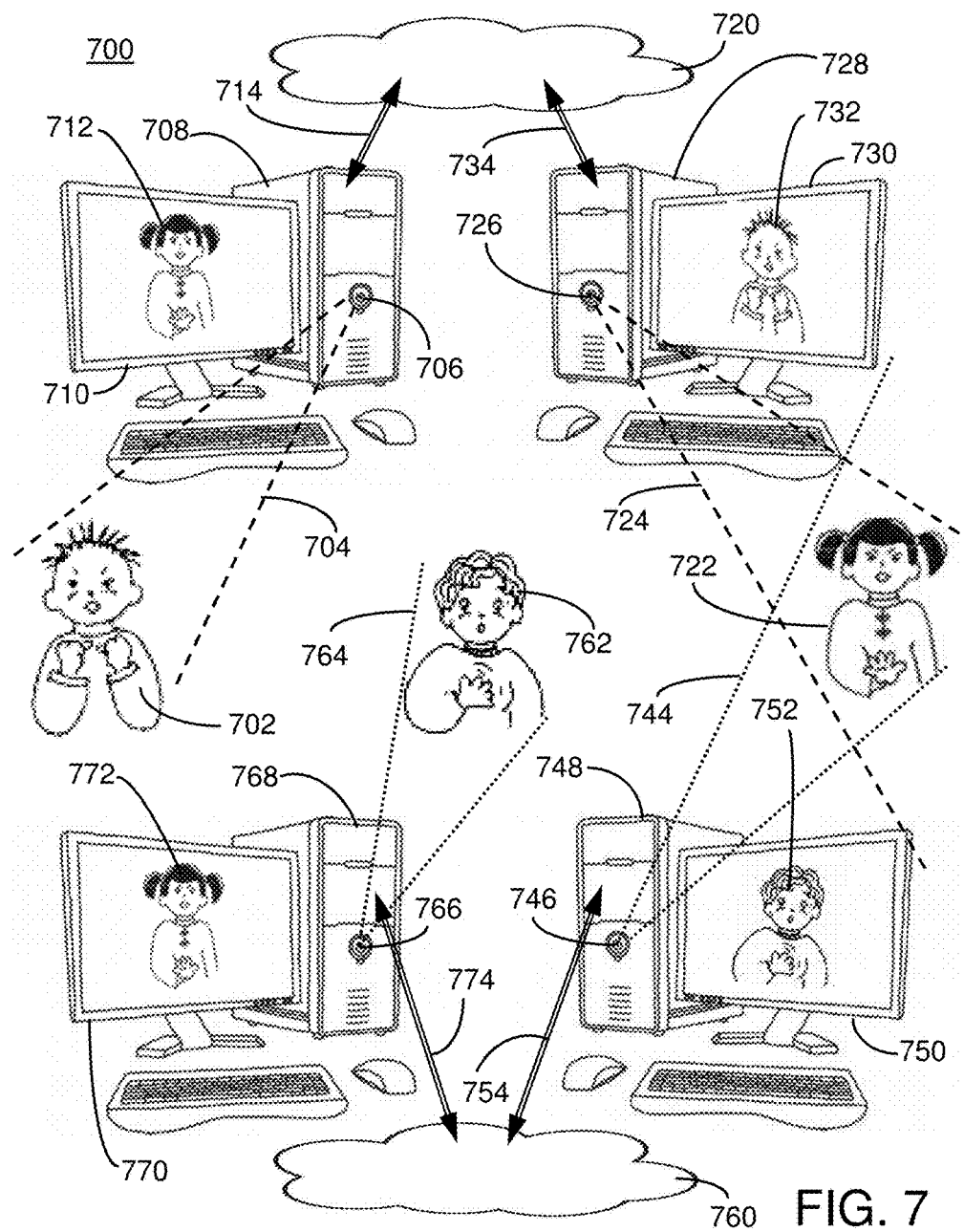
FIG. 7 shows an exemplary scenario E call according to a first embodiment.

FIG. 7 shows an exemplary call 700 between a D-HOH-SI inmate 702 and a D-HOH-SI called party 762 under scenario E according to a first embodiment in which there is a "man-in-the-middle" (SLI 722) between inmate 702 and called party 762. The standard security procedures for this call have been met: 1) called party 762 is on the authorized call list for inmate 702, and 2) the VRS call may be video recorded unless called party 762 is on the confidential call number list (attorneys, clergy, etc.)

Inmate 702 may view SLI 722 on a display 710, wherein a video capture device 706 (in a VRS client 708) captures (with a field of view 704) an image of inmate 702 of sufficient quality for a display 732 on a screen 730, visible to SLI 722, to enable SLI 722 to interpret sign language presented by inmate 702. Similarly, a video capture device 726 (in a VRS client 728) captures (with a field of view 724) an image of SLI 722 of sufficient quality for a display 712 on screen 710 to enable inmate 702 to interpret sign language presented by SLI 722. VRS client 708 is connected to a network 720 by a link 714, while VRS client 728 is connected to network 720 by a link 734. In some embodiments, network 760 may be the same as network 720, while in some embodiments, network 760 may be a different network than network 720.

SLI 722 may view called party 762 on a display 750, wherein a video capture device 746 (in a video communications terminal 748) captures (with a field of view 744) an image of SLI 722 of sufficient quality for a display 772 on a screen 770 to enable called party 762 to interpret sign language presented by SLI 722. Similarly, a video capture device 766 (in a VRS client 768) captures (with a field of view 764) an image of called party 762 of sufficient quality for a display 752 on screen 750 to enable SLI 722 to interpret sign language presented by called party 762. Video communications terminal 748 is connected to a network 760 by a link 754, while video communications terminal 768 is connected to network 760 by a link 774.

What are some security and safety benefits of embodiments implementing scenario E (FIGS. 6-9 and 11) in a correctional environment, instead of scenario D (FIGS. 4, 5, and 10)? In FIG. 7, inmate 702 is displaying the ASL gesture for "anger", the same as inmate 502 in FIG. 5. Called party 762 is displaying the ASL gesture for "fear", the same as called party 552 in FIG. 5. The difference between scenarios D and E is that, in FIG. 7, these gestures are not conveyed back-and-forth between inmate 702 and called party 762, and instead, both inmate 702 and called party 762 see only SLI 722, who is displaying the ASL gesture for "stop" in this example.

Inmate 702 may still be angry with something or someone, however this angry message is not being conveyed to called party 762. Similarly, called party 762 may be afraid or fearful of something or someone, but this message is not being conveyed to inmate 702. Essentially the "man-in-the-middle" (SLI 722) acts as a barrier for all non-ASL communication between inmate 702 and 762, unlike the situation in scenario D where all kinds of improper and undesirable "secret message" interactions and communications may occur between inmate 502 and called party 552. Note that for this indirect communications situation to occur, it is preferable that video capture device 726 cannot "see" screen 750—this is illustrated in FIG. 7 where field of view 724 does not include screen 750. Similarly, it is preferable that video capture device 746 cannot "see" screen 730—this is illustrated in FIG. 7 where field of view 744 does not include screen 730. As for scenario D, in scenario E video recording of this call (assuming it is non-confidential) would record the interaction between inmate 702 and SLI 722, which, since it may be expressed solely through standard ASL gestures, would be interpretable by correctional authorities. Any non-ASL gestures made by inmate 702 may be ignored by SLI 722 and not transmitted to called party 762. Similarly, any other non-verbal signs (clothing colors or patterns, clothing accessories, etc.) affected by inmate 702 would either be ignored or not detected by SLI 722, and thus would not be communicated to called party 762. Conversely, any attempted non-ASL communication to inmate 702 from called party 762 would also not be conveyed by SLI 722.

Figure 8:
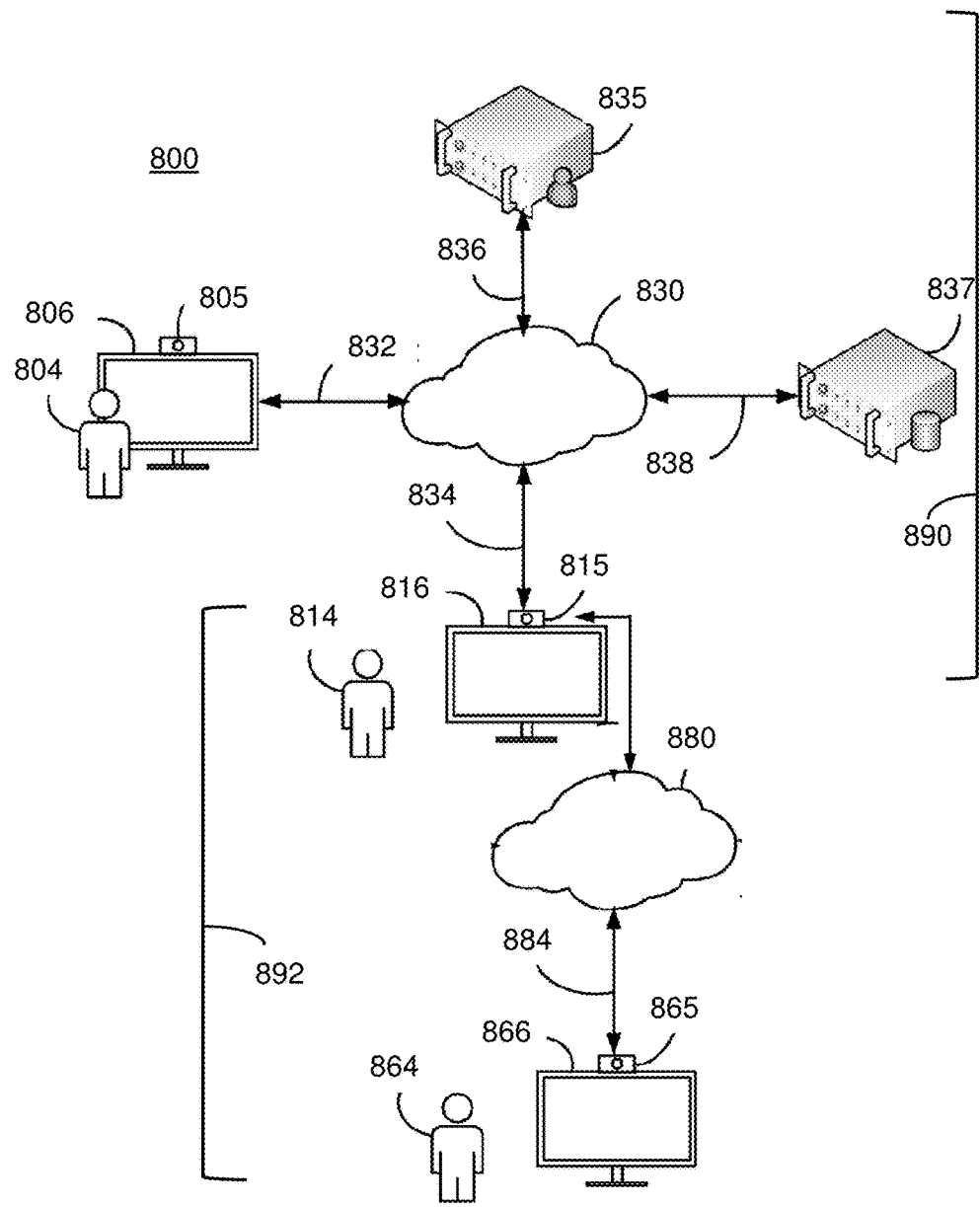
FIG. 8 shows scenario E: a D-HOH-SI inmate indirectly calling a D-HOH-SI called party according to a second embodiment.

Scenario E: D-HOH-SI Inmate Indirectly Calling a D-HOH-SI Called Party According to a Second Embodiment FIG. 8 shows scenario E 800: a D-HOH-SI inmate 804 indirectly communicating with a D-HOH-SI called party 864 according to a second embodiment. The system shown in FIG. 8 comprises two parts:

1) a first video link 890 between D-HOH-SI inmate 804 and an SLI 814, and 2) a second video link 892 between SLI 814 and D-HOH-SI called party 864.

Figure 9:
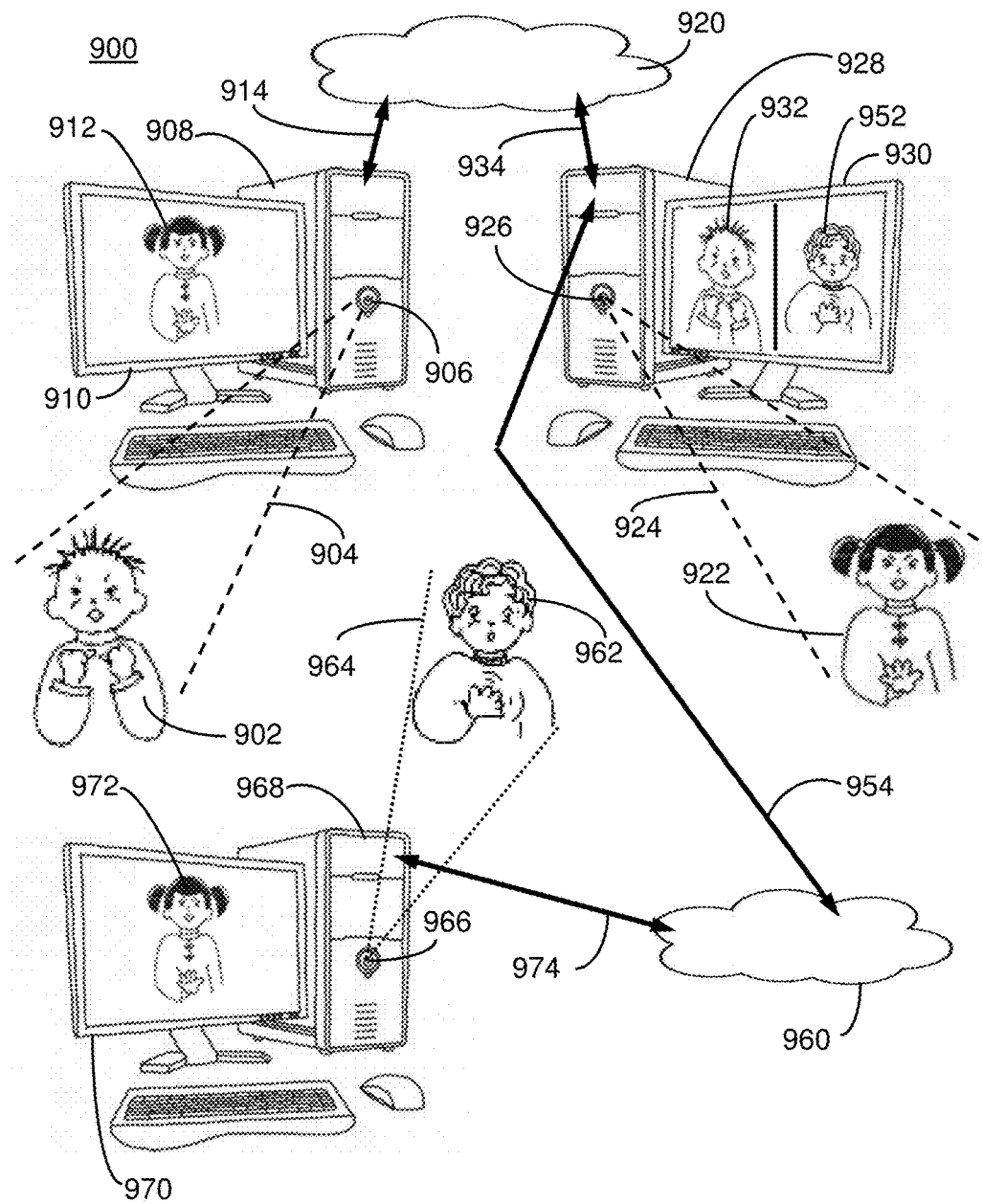
FIG. 9 shows an exemplary scenario E call according to a second embodiment.

A main difference between the first embodiment in FIGS. 6 and 7, and the second embodiment in FIGS. 8 and 9, is the configuration of displays and video capture devices, and embedded software, at the site occupied by the SLI 814. The first video link 890 is comparable in function to the first link 690 (FIG. 6), while the second video link 892 is comparable in function to the second link 692 (FIG. 6).

As for the first embodiment, D-HOH-SI inmate 804 wants to communicate with D-HOH-SI called party 864, however because of the safety and security concerns discussed for scenario D, an intermediate "Man-in-the-Middle" (SLI 814) is used to prevent any of the secret signals discussed for scenario D in FIG. 5 from being communicated between inmate 804 and called party 864. Inmate 804 is in proximity to, and interacts with, a VRS client 805 thereby being able to communicate by a video link 832 with a network 830. Inmate 804 may be a person who is D-HOH-SI, or any other person who communicates via SL. Inmate 804 interacts with VRS client 805 by viewing video on a display 806 and by being viewed with a video capture device (e.g., video camera) in VRS client 805. Display 806 is any device suitable for displaying to inmate 804 a video signal from SLI 814 (at a VRS client 815), with sufficient video quality and frame rate so that an inmate 804 can comprehend the SL gestures communicated by SLI 814. VRS client 805 also includes hardware and/or software to, substantially in real-time, convert the captured video signal into a data stream suitable for transmission to network 830 over video link 832.

A VRS client 815 can be operated by a VRS service provider. A display 816 can be any device suitable for displaying to SLI 814 a video signal of inmate 804 with sufficient quality and frame rate so that SLI 814 can comprehend the SL gestures communicated by inmate 804. VRS client 815 can include a video capture device suitable for capturing a video signal of SLI 814 within the field-of-view of the video capture device at sufficient quality and frame rate to support SL communication with inmate 804. VRS client 815 also includes hardware and/or software to convert, substantially in real-time, the captured video signal into a data stream suitable for transmission to network 830 over a video link 834.

A rules gateway 835 is connected to network 830 over a link 836. Rules gateway 835 may be located in the corrections environment where inmate 804 is located or rules gateway 835 may be included in service side equipment located at a facility operated by the VRS service provider. Rules gateway 835 has the same two functions as rules gateway 335 in FIG. 3 (scenario C) and rules gateway 635 in FIG. 6 (first embodiment of scenario E).

A recorder 837 is a device capable of recording video calls, including audio, video, and any watermarks applied to the call. Recorder 837 can be connected to network 830 over link 838. Recorder 837 may be located in the corrections environment where inmate "804 is located, or recorder 837 may be included in service side equipment located at a facility operated by the VRS service provider. Recorder 837 can be programmed to automatically record a VRS call based on call properties associated with the VRS call (stored in rules gateway 835).

Rules gateway 835, recorder 837, VRS client 805, and VRS client 815 may be implemented as separate and distinct systems that operate independent of location and communicate with each other by way of network 830, possibly employing various internet protocols. Alternatively, one or more of rules gateway 835, recorder 837, VRS client 805, and VRS client 815 may be combined to suit a particular application. The same redundancy considerations apply to the recording of video calls in scenario E as applied in FIG. 3 (scenario C), in FIG. 4 (scenario D), and in FIG. 6 for the first embodiment for scenario E.

The VRS client 815 for the second embodiment performs the functions of the video communications terminal 655 in the first embodiment: acquisition of images of SLI 814 (using the same video capture device used for communication with inmate 804), and displaying images of called party 864 (on a split-screen display which simultaneously displays both inmate 804 and called party 864—see FIG. 9).

A display 866 can be any device suitable for displaying to called party 864 a video signal of SLI 814 with sufficient quality and frame rate so that called party 864 can comprehend the SL gestures communicated by SLI 814. A video communications terminal 865 can include a video capture device suitable for capturing a video signal of called party 864 within the field-of-view of the video capture device at sufficient quality and frame rate to support SL communication with SLI 814. Video communications terminal 865 also includes hardware and/or software to convert, substantially in real-time, the captured video signal into a data stream suitable for transmission to a network 880 over a video link 884. In some embodiments, network 880 may be the same as network 830. In some embodiments, network 880 may be a different network than network 830. In embodiments, video communications terminal 855 may be a commonly-available video communications terminal such as Skype, etc.

Inmate 804 initiates a VRS call to SLI 814. SLI 814 and inmate 804 communicate using SL via VRS client 815 and VRS client 805, respectively. SLI 814 and called party 864 interact using SL via VRS client 815 and video communications terminal 865, respectively. For the second embodiment, VRS client 815 serves the dual function of interacting with inmate 804 and called party 864, unlike the situation for the first embodiment, where VRS client 615 only interacted with inmate 604. As for the first embodiment, there is no possibility for non-ASL communication (shirt color or pattern, clothing accessories, non-ASL hand gestures, non-speech sounds, etc.) to occur between inmate 804 and called party 864. To prevent inadvertent direct video communication between inmate 804 and called party 864, it is preferred that the video capture device in VRS client 815 is incapable of viewing display 816.

An Exemplary Scenario E Call According to a Second Embodiment

FIG. 9 shows an exemplary call 900 between a D-HOH-SI inmate 902 and a D-HOH-SI called party 962 under scenario E according to a second embodiment in which there is a "man-in-the-middle" (SLI 922) between inmate 902 and called party 962. As for the first embodiment, the standard security procedures for this call have been met: 1) called party 962 is on the authorized call list for inmate 902, and 2) the VRS call may be video recorded unless called party 962 is on the confidential call number list (attorneys, clergy, etc.)

Inmate 902 may view SLI 922 on a display 910, wherein a video capture device 906 (in a VRS client 908) captures (with a field of view 904) an image of inmate 902 of sufficient quality for the display 932 on a screen 930, visible to SLI 922, to enable SLI 922 to interpret sign language presented by inmate 902. Similarly, a video capture device 926 (in a VRS client 928) captures (with a field of view 924) an image of SLI 922 of sufficient quality for the display 912 on screen 910 to enable inmate 902 to interpret sign language presented by SLI 922. VRS client 908 is connected to network 920 by a link 914, while VRS client 928 is connected to network 920 by a link 934.

SLI 922 may view called party 962 on display 930, showing a split-screen or other type of multiple-image (e.g., multiple windows) display of both inmate 902 and called party 962. Images captured by video capture device 926 should be of sufficient quality (since they are also of sufficient quality for inmate 902) for a display 972 on a screen 970 to enable called party 962 to interpret sign language presented by SLI 922. A video capture device 966 (in a VRS client 968) captures (with a field of view 964) an image of called party 962 of sufficient quality for a display 952 on screen 930 to enable SLI 922 to interpret sign language presented by called party 962. Video communications terminal 968 is connected to network 960 by a link 974. In some embodiments, network 960 may be the same as network 920, while in some embodiments, network 960 may be a different network than network 920 with a link 954 between networks 920 and 960.

The same security and safety benefits of implementing scenario E (instead of scenario D) apply for the second embodiment (FIGS. 8 and 9) as for the first embodiment (FIGS. 6 and 7). Since the second embodiment does not require video communications terminal 748, there are potential cost and reliability benefits for the second embodiment. Note that as for the first embodiment, it is necessary that the video capture device 926 cannot "see" display 930 in order to prevent inadvertent direct video communication between inmate 902 and called party 962, both of whose images may be displayed on screen 930 simultaneously—this is illustrated in FIG. 9 where field of view 924 does not include screen 930.

While FIG. 9 shows only one video capture device 926, more than one video capture device can be used. For example, two video capture devices can be used. The two video capture devices can be placed in locations apart from each other so that SLI 922 must turn her head to look from one video capture device to the other. The turning of the head of SLI 922 can be used by inmate 902 and called party 926 as an indicator of the party with whom SLI 922 is communicating. That is, when SLI 922 appears in display 912 on screen 910 as looking directly out of screen 910, inmate 902 can infer that SLI 922 is signing to inmate 902. When SLI 922 turns her head and appears in display 912 on screen 910 as looking to the side of screen 910, inmate 902 can infer that SLI 922 is signing to called party 962. Similarly, when SLI 922 appears in display 972 on screen 970 as though she is looking directly out of screen 970, called party 962 can infer that SLI 922 is signing to called party 962. When SLI 922 turns her head and appears in display 972 on screen 970 as though she is looking to the side of screen 970, called party 962 can infer that SLI 922 is signing to inmate 902.

Flowchart for Inmate-to-Called Party Scenarios A-D

FIG. 10 shows a flowchart 1000 for inmate-to-called party scenarios A-D. The method starts at a block 1002, which may represent an inmate applying to the correctional institution authorities to place an outside call to a spouse, significant other, family member, friend, attorney, clergyman, etc. The identity of the inmate and the called party (and phone number) are identified in a block 1004. In a decision block 1006, the called party number supplied by the inmate is checked against the list of allowed called party numbers from the rules gateway, as described in FIGS. 2-9. If the called party phone number is not on the allowed list, a block 1008 is entered and no call is placed—in this case, disciplinary action against the inmate may be initiated for this attempt to place an unauthorized outside call. If the called party number is on the allowed list, a decision block 1010 is entered, and pre-stored data for the inmate with respect to their evaluated status: D-HOH-SI or non-D-HOH-SI, is accessed from the rules gateway. If the inmate has been pre-classified as non-D-HOH-SI, then a block 1012 is entered and an all-audio call is placed according to either scenario A (if the called party is non-D-HOH-SI) or scenario B (if the called party is D-HOH-SI)—from the perspective of the correctional institution, there may be no distinction between scenarios A and B, the only difference being at the called party's site. If the inmate has been pre-classified as D-HOH-SI, then a decision block 1010 branches to a decision block 1014, to determine if the called party is D-HOH-SI or non-D-HOH-SI. Information applying to the called party may in some cases be pre-stored in the rules gateway, linked to the pre-stored authorized calling party phone numbers. In other cases, the inmate or some other individual may supply information about the status (D-HOH-SI or non-D-HOH-SI) of the called party. If the called party is non-D-HOH-SI, then a block 1016 is entered and call scenario C is initiated. If the called party is D-HOH-SI then a block 1020 is entered and call scenario D may be initiated, assuming that a blocking "X" 1018 is ignored, where the blocking "X" 1018 represents a preference on the part of correctional facility authorities to avoid placement of scenario D calls based on safety and security concerns.

Flowchart for Inmate-to-Called Party Scenarios A-C and E According to Embodiments FIG. 11 shows a flowchart 1100 for inmate-to-called party scenarios A-C and E. Flowchart 1100 applies to the first embodiment (FIGS. 6 and 7) and to the second embodiment (FIGS. 8 and 9), as well as other system configurations falling within the scope of the invention. The branching in flowchart 1100 differs from that in flowchart 1000 after several early branches have been followed which are the same in flowcharts 1000 and 1100. The method starts at a block 1102, which may represent an inmate applying to the correctional institution authorities to place an outside call to a spouse, significant other, family member, friend, attorney, clergyman, etc. The identity of the inmate and the called party are identified in a block 1104. In a decision block 1106, the called party number supplied by the inmate is checked against the list of allowed called party numbers from the rules gateway, as described in FIGS. 2, 3, 6 and 8. If the called party phone number is not on the allowed list, a block 1108 is entered and no call is placed—in this case, disciplinary action against the inmate may be initiated for this attempt to place an unauthorized outside call. If the called party number is on the allowed list, a decision block 1110 is entered, and pre-stored data for the inmate with respect to their evaluated status: D-HOH-SI or non-D-HOH-SI, is accessed from the rules gateway. If the inmate has been pre-classified as non-D-HOH-SI, then a block 1112 is entered and an all-audio call is placed per either scenario A (if the called party is non-D-HOH-SI) or scenario B (if the called party is D-HOH-SI). If the inmate has been pre-classified as D-HOH-SI, then decision block 1110 branches to a decision block 1114, to determine if the called party is D-HOH-SI or non-D-HOH-SI. Information applying to the called party may in some cases be pre-stored in the rules gateway, linked to the pre-stored authorized calling party phone numbers. In other cases, the inmate or some other individual may supply information about the status (D-HOH-SI or non-D-HOH-SI) of the called party. If the called party is not D-HOH-SI, then a block 1116 is entered and call scenario C is initiated.

At this point, flowcharts 1000 and 1100 begin to differ, taking into account that after the possibilities of placing calls according to scenarios A-C are dismissed (i.e., the inmate and the called party are both D-HOH-SI), now the only remaining alternatives are scenario D (FIG. 10) or scenario E (FIG. 11). If the called party is D-HOH-SI then a block 1118 is entered and a call scenario E 1124 (comprising blocks 1118-1122) may be initiated by determining a phone number for the "Man-in-Middle" (the MiM), for example SLI 614 (FIG. 6) or SLI 814 (FIG. 8). In a block 1120, a VRS call is placed from the inmate to the MiM, and then in a block 1122, a video call is placed from the MiM to the called party.

The following are additional enumerated embodiments according to the present disclosure.

A first embodiment, which is a system for making indirect video calls between a deaf, hard of hearing, and/or speech impaired (D-HOH-SI) user of a video relay service (VRS) system and a D-HOH-SI called party, comprising a first video link, including a first VRS client at the corrections facility; and a second VRS client for use by a sign language interpreter (SLI); and a second video link, including a first video communications terminal for use by the SLI; and a second video communications terminal for use by the called party.

A second embodiment, which is the system of the first embodiment, wherein in the first video link, the first VRS client comprises a first video capture device; and wherein in the first video link, the second VRS client comprises a second video capture device.

A third embodiment, which is the system of the second embodiment, wherein in the first video link, the first VRS client comprises a first display for displaying images of the SLI acquired with the second video capture device; and wherein in the first video link, the second VRS client comprises a second display for displaying images of the user acquired with the first video capture device.

A fourth embodiment, which is the system of the third embodiment, wherein in the second video link, the first video communications terminal comprises a third video capture device; and wherein in the second video link, the second video communications terminal comprises a fourth video capture device.

A fifth embodiment, which is the system of the fourth embodiment, wherein in the second video link, the first video communications terminal comprises a third display for displaying images of the called party acquired with the fourth video capture device; and wherein in the second video link, the second video communications terminal comprises a fourth display for displaying images of the SLI acquired with the third video capture device.

A sixth embodiment, which is the system of the fifth embodiment, wherein in the first video link, the second video capture device is configured not to acquire images from the third display; and wherein in the second video link, the third video capture device is configured not to acquire images from the second display.

A seventh embodiment, which is the system of the first embodiment, wherein the first video link further comprises a rules gateway; and wherein the rules gateway stores calling information for users at the corrections facility.

An eighth embodiment, which is the system of the seventh embodiment, wherein in the first video link, the calling information stored in the rules gateway comprises a list of allowed called party phone numbers, wherein the called party phone numbers have indications of confidentiality or non-confidentiality; and a classification of the user being D-HOH-SI or non-D-HOH-SI.

A ninth embodiment, which is the system of the eighth embodiment, wherein the first video link further comprises a recording system, the recording system being configured to record video calls conducted over the first video link, wherein video calls to calling parties indicated as confidential in the data stored in the rules gateway are prevented from being recorded.

A tenth embodiment, which is the system of the first embodiment, wherein the second VRS client and the first video communications terminal are comprised in a single device.

An eleventh embodiment, which is the system of the first embodiment, wherein the second VRS client and the first video communications terminal are separate devices.

A twelfth embodiment, method for making indirect video calls between a deaf, hard of hearing, and/or speech impaired (D-HOH-SI) user of a video relay service (VRS) system and a D-HOH-SI called party, the method comprising providing a first video link, including a first VRS client at the corrections facility; and a second VRS client for use by a sign language interpreter (SLI); providing a second video link, including a first video communications terminal for use by the SLI; and a second video communications terminal for use by the called party; initiating a VRS call between the first VRS client and the second VRS client; initiating a video call between the first video communications terminal and the second video communications terminal; communicating between the user and the SLI by use of sign language through the first video link; and communicating between the SLI and the called party by use of sign language through the second video link.

A thirteenth embodiment, which is the method of the twelfth embodiment, wherein providing the first video link further comprises configuring the first VRS client to include a first video capture device; and configuring the second VRS client to include a second video capture device.

A fourteenth embodiment, which is the method of the thirteenth embodiment, wherein providing the first video link further comprises configuring the first VRS client to include a first display for displaying images acquired with the second video capture device; and configuring the second VRS client to include a second display for displaying images acquired with the first video capture device.

A fifteenth embodiment, which is the method of the fourteenth embodiment, wherein providing the second video link further comprises configuring the first video communications terminal to include a third video capture device; and configuring the second video communications terminal to include a fourth video capture device.

A sixteenth embodiment, which is the method of the fifteenth embodiment, wherein providing the second video link further comprises configuring the first video communications terminal to include a third display for displaying images acquired with the fourth video capture device; and configuring the second video communications terminal to include a fourth display for displaying images acquired with the third video capture device.

A seventeenth embodiment, which is the method of the sixteenth embodiment, wherein providing the first video link further comprises configuring the second video capture device not to acquire images from the third display, and configuring the third video capture device not to acquire images from the second display.

An eighteenth embodiment, which is the method of the twelfth embodiment, wherein providing the first video link further comprises a rules gateway; and wherein the rules gateway stores calling information for users at the corrections facility.

A nineteenth embodiment, which is the method of the eighteenth embodiment, wherein providing the first video link further comprises configuring the calling information stored in the rules gateway to include a list of allowed called party phone numbers; wherein the called party phone numbers have indications of confidentiality or non-confidentiality and a classification of the user being D-HOH-SI or non-D-HOH-SI.

A twentieth embodiment, which is the method of the nineteenth embodiment, wherein providing the first video link further comprises a recording system, the recording system being configured to record video calls conducted over the first video link, wherein video calls to calling parties indicated as confidential in the data stored in the rules gateway are prevented from being recorded.

A twenty-first embodiment, which is a method for making indirect video calls between a deaf, hard of hearing, and/or speech impaired (D-HOH-SI) user and a D-HOH-SI called party, the method comprising providing a first video link, between the user and a sign language interpreter (SLI); providing a second video link, between the SLI and the called party; configuring the first and second video links to prevent any video interaction; initiating a video call between the user and the SLI; initiating a video call between the SLI and the called party; communicating between the user and the SLI by use of sign language through the first video link; and communicating between the SLI and the called party by use of sign language through the second video link.

While the foregoing describes a preferred embodiment of the present invention, one skilled in the art will appreciate that various changes, substitutions and alterations can be made without departing from the scope of the invention. For example, a single device having an integrated VRS client 105, 115 and display 106, 116 is within the scope of the present invention. Moreover, VRS clients 105 and 115 implemented as software executing on general purpose computers meeting the hardware requirements for video telephony over IP networks and programmed with software to perform the functions of VRS clients 105, 115, and displays 106, 116, as disclosed herein is within the scope of the present invention. Such general-purpose computers include desktop personal computers (PCs), laptop computers, tablet computers, smartphones, etc. Portable devices such as smartphones and tablets having front-facing cameras and IP data connectivity can be particularly useful in helping D-HOH-SI persons communicate with hearing persons via VRS service due to the mobility of the portable devices.

Although the present invention and its advantages have been described in detail, it should be understood that various changes, substitutions and alterations can be made herein without departing from the scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim as follows:

1. A system for making indirect video calls between a deaf, hard of hearing, and/or speech impaired (D-HOH-SI) user of a video relay service (VRS) system and a D-HOH-SI called party, comprising:

a first video link, including:
  a first VRS client at a corrections facility for use by the D-HOH-SI user; and
  a second VRS client for use by a sign language interpreter (SLI); and
a second video link, including:
  a first video communications terminal for use by the SLI; and
  a second video communications terminal for use by the D-HOH-SI called party;
in which the D-HOH-SI called party and the D-HOH-SI user of the first VRS client cannot see each other during the VRS call.

2. The system of claim 1, wherein in the first video link, the first VRS client comprises a first video capture device; and wherein in the first video link, the second VRS client comprises a second video capture device.

3. The system of claim 2, wherein in the first video link, the first VRS client comprises a first display for displaying images of the SLI acquired with the second video capture device; and wherein in the first video link, the second VRS client comprises a second display for displaying images of the user acquired with the first video capture device.

4. The system of claim 3, wherein in the second video link, the first video communications terminal comprises a third video capture device; and wherein in the second video link, the second video communications terminal comprises a fourth video capture device.

5. The system of claim 4, wherein in the second video link, the first video communications terminal comprises a third display for displaying images of the called party acquired with the fourth video capture device; and wherein in the second video link, the second video communications terminal comprises a fourth display for displaying images of the SLI acquired with the third video capture device.

6. The system of claim 5, wherein in the first video link, the second video capture device is configured not to acquire images from the third display; and wherein in the second video link, the third video capture device is configured not to acquire images from the second display.

7. The system of claim 1, wherein the first video link further comprises a rules gateway; and wherein the rules gateway stores calling information for users at the corrections facility.

8. The system of claim 7, wherein in the first video link, the calling information stored in the rules gateway comprises a list of allowed called party phone numbers, wherein the called party phone numbers have indications of confidentiality or non-confidentiality; and a classification of the user being D-HOH-SI or non-D-HOH-SI.

9. The system of claim 8, wherein the first video link further comprises a recording system, the recording system being configured to record video calls conducted over the first video link, wherein video calls to calling parties indicated as confidential in the data stored in the rules gateway are prevented from being recorded.

10. The system of claim 1, wherein the second VRS client and the first video communications terminal are comprised in a single device.

11. The system of claim 1, wherein the second VRS client and the first video communications terminal are separate devices.

12. A method for making indirect video calls between a deaf, hard of hearing, and/or speech impaired (D-HOH-SI) user of a video relay service (VRS) system and a D-HOH-SI called party, the method comprising:

providing a first video link, including:
- a first VRS client at the corrections facility for use by the D-HOH-SI user; and
- a second VRS client for use by a sign language interpreter (SLI);

providing a second video link, including:
- a first video communications terminal for use by the SLI; and
- a second video communications terminal for use by the D-HOH-SI called party;

initiating a VRS call between the first VRS client and the second VRS client;

initiating a video call between the first video communications terminal and the second video communications terminal;

communicating between the D-HOH-SI user and the SLI by use of sign language through the first video link; and communicating between the SLI and the D-HOH-SI called party by use of sign language through the second video link;

in which the D-HOH-SI called party and the D-HOH-SI user of the first VRS client cannot see each other during the VRS call.

13. The method of claim 12, wherein providing the first video link further comprises configuring the first VRS client to include a first video capture device; and configuring the second VRS client to include a second video capture device.

14. The method of claim 13, wherein providing the first video link further comprises configuring the first VRS client to include a first display for displaying images acquired with the second video capture device; and configuring the second VRS client to include a second display for displaying images acquired with the first video capture device.

15. The method of claim 14, wherein providing the second video link further comprises configuring the first video communications terminal to include a third video capture device; and configuring the second video communications terminal to include a fourth video capture device.

16. The method of claim 15, wherein providing the second video link further comprises configuring the first video communications terminal to include a third display for displaying images acquired with the fourth video capture device; and configuring the second video communications terminal to include a fourth display for displaying images acquired with the third video capture device.

17. The method of claim 16, wherein providing the first video link further comprises configuring the second video capture device not to acquire images from the third display, and configuring the third video capture device not to acquire images from the second display.

18. The method of claim 12, wherein providing the first video link further comprises a rules gateway; and wherein the rules gateway stores calling information for users at the corrections facility.

19. The method of claim 18, wherein providing the first video link further comprises configuring the calling information stored in the rules gateway to include a list of allowed called party phone numbers; wherein the called party phone numbers have indications of confidentiality or non-confidentiality and a classification of the user being D-HOH-SI or non-D-HOH-SI.

20. The method of claim 19, wherein providing the first video link further comprises a recording system, the recording system being configured to record video calls conducted over the first video link, wherein video calls to calling parties indicated as confidential in the data stored in the rules gateway are prevented from being recorded.

21. A method for making indirect video calls between a deaf, hard of hearing, and/or speech impaired (D-HOH-SI) user and a D-HOH-SI called party, the method comprising:
- providing a first video link, between the D-HOH-SI user and a sign language interpreter (SLI);
- providing a second video link, between the SLI and the D-HOH-SI called party;
- configuring the first and second video links to prevent any video interaction;
- initiating a video call between the D-HOH-SI user and the SLI;
- initiating a video call between the SLI and the D-HOH-SI called party;
- communicating between the D-HOH-SI user and the SLI by use of sign language through the first video link; and
- communicating between the SLI and the D-HOH-SI called party by use of sign language through the second video link;
- in which the D-HOH-SI called party and the D-HOH-SI user of the first VRS client cannot see each other during the VRS call.

\* \* \* \* \*